United States Patent
Murayama

(10) Patent No.: US 7,672,029 B2
(45) Date of Patent: Mar. 2, 2010

(54) CREATION OF LOOKUP TABLE FOR PRINTING WITH CONTRASTING DENSITY INK

(75) Inventor: Susumu Murayama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 784 days.

(21) Appl. No.: 11/358,046

(22) Filed: Feb. 22, 2006

(65) Prior Publication Data

US 2006/0203269 A1    Sep. 14, 2006

(30) Foreign Application Priority Data

Feb. 23, 2005  (JP) .............................. 2005-047547

(51) Int. Cl.
- *G03F 3/08* (2006.01)
- *B41J 2/205* (2006.01)
- *B41J 2/21* (2006.01)
- *G01D 11/00* (2006.01)

(52) U.S. Cl. ...................... 358/518; 358/519; 358/520; 347/15; 347/43; 347/100

(58) Field of Classification Search .................. 358/1.9, 358/1.15, 1.16, 504, 518; 347/100; 382/100, 382/167, 280

See application file for complete search history.

(56) References Cited

U.S. PATENT DOCUMENTS

| | | | | |
|---|---|---|---|---|
| 4,952,942 A | * | 8/1990 | Kanome et al. | ............... 347/15 |
| 4,959,659 A | * | 9/1990 | Sasaki et al. | .................. 347/43 |
| 2003/0038870 A1 | * | 2/2003 | Shimada | ...................... 347/100 |
| 2003/0151667 A1 | * | 8/2003 | Nakami et al. | ........... 348/207.1 |
| 2003/0210414 A1 | * | 11/2003 | Kuno | .......................... 358/1.9 |

FOREIGN PATENT DOCUMENTS

JP    3582649 B2    8/2004

* cited by examiner

*Primary Examiner*—Mark K Zimmerman
*Assistant Examiner*—Haris Sabah
(74) *Attorney, Agent, or Firm*—Sughrue Mion, PLLC

(57) ABSTRACT

In printing using a plurality of chromatic color inks of different lightness interchangeable with one another in color reproduction, ink consumption is reduced while preserving the quality of the printed result. On the basis of first color data represented in terms of density of a first reference color, second color data represented in terms of density of a plurality of second reference colors is generated. The plurality of second reference colors are the ink colors. They include two same hue reference colors of different lightness interchangeable with one another when reproducing a certain color. The lookup table holds the first color data and the second color data associated with one another. For a set of densities of a plurality of second reference colors representing achromatic color of higher lightness than the reference lightness, density of the same hue reference color having lower lightness is 0. The reference lightness is lightness equal to or less than the minimum lightness which is the lightness of the color having the lowest lightness among the colors that can be reproduced on a printing medium using only ink of the darker color of the two same hue reference colors.

9 Claims, 7 Drawing Sheets

CREATION OF LOOKUP TABLE FOR PRINTING WITH CONTRASTING DENSITY INK

BACKGROUND OF THE INVENTION

1. Field of the Invention

This invention relates to technology for printing with two kinds of chromatic color inks which are interchangeable with one another when reproducing some colors, and which differ in lightness.

2. Description of the Related Art

To date, in monotone printing to produce a printed result like a black and white photograph, printing has been carried out using chromatic color ink in addition to achromatic color ink. For example, high density cyan ink, low density cyan ink, high density magenta ink, low density magenta ink, and yellow ink are used in color printing, and when carrying out monotone printing, the low density cyan ink, the high density magenta ink, and the yellow ink are used in addition to achromatic color ink.

By means of recording high density cyan ink sparsely and recording low density cyan ink densely, it is possible to reproduce comparable cyan components with these cyan inks of different density. Also, by recording high density magenta ink sparsely and recording low density magenta ink densely it is possible to reproduce comparable magenta components with these magenta inks of different density. Accordingly, these two pairs of ink are interchangeable with one another when reproducing some colors.

In monotone printing using such chromatic color inks, by using the low density inks as the chromatic color inks, it is possible to reduce the appearance of graininess in printed images. However, due to the light color of the chromatic color inks, large amounts of chromatic color ink will be consumed when printing areas of dark gray. Where the high density inks are used as the chromatic color inks on the other hand, ink consumption can be reduced. However, printed images will tend to have visible graininess.

In conventional technologies, during printing with the use of two kinds of chromatic color inks interchangeable with one another when reproducing some colors but differing in lightness as described above, the issue of how to best use these inks in order to achieve a favorable balance between ink consumption and the quality of the printed result was not taken into consideration.

The present invention is directed to printing with the use of multiple types of chromatic color inks interchangeable with one another when reproducing some colors but differing in lightness, and has as an object to provide technology whereby ink consumption may be reduced, while preserving the quality of the printed result.

The present invention is related to Japanese patent application No. 2005-47547, filed Feb. 23, 2005; the contents of which are incorporated herein by reference.

SUMMARY OF THE INVENTION

In order to address at least one of the aforementioned problems, the present invention employs the following arrangement, in an image processing device that generates second color data represented in terms of density of a plurality of second reference colors, on the basis of first color data represented in terms of density of one or more first reference colors. The image processing device is equipped with: a lookup table including first color data associated with second color data, the first color data being represented in terms of density of one or more first reference colors, and the second color data being represented in terms of density of a plurality of second reference colors; and a color conversion unit configured to generate the second color data based on the first color data by referring to the lookup table. The plurality of second reference colors are colors of inks used by a printing device, and include two same hue reference colors having same hue but different lightness.

In the lookup table, a first same hue reference color having lower lightness among the two same hue reference colors has density of 0, in data sets of second color data representing color of higher lightness than a reference lightness, from among a plurality of data sets of the second color data that correspond to a plurality of data sets of the first color data representing achromatic color. The reference lightness is lightness equivalent to 110% or less of minimum lightness. The minimum lightness is lightness of color having lowest lightness among colors that can be reproduced on a printing medium using only ink of the first same hue reference color.

In this embodiment, in printing of image data that includes the generated second color data, ink of the first same hue reference color is used in areas of darkness about the same as the darkest color that can be reproduced with the first same hue reference color, and in areas representing even darker color. For such areas, despite the use of ink of the first same hue reference color, dots of the first same hue reference color hardly stand out in the printed product. Accordingly, it is possible to reduce ink consumption while preserving the quality of the printed result, in the course of printing with the use of multiple types of chromatic color inks interchangeable with one another when reproducing some colors but differing in lightness. In preferred practice, density set of a first reference color and a density sets of a plurality of second reference color both of which represent substantially equivalent color are stored associated with one another in the lookup table.

The first reference color may be gray. In this case, the first color data will be data represented in terms of gray density. In this embodiment, a one-dimensional lookup table can be used as the lookup table. Accordingly, where one-dimensional and three-dimensional lookup tables hold information at about the same level of density with respect to difference between two degrees of lightness of the color being processed, the data size of the one-dimensional lookup table is smaller, as compared to the three-dimensional table for color data.

The first reference colors may be red, green, and blue. In this case, the first color data is data represented as a set of color densities for red, green, and blue. In this embodiment, even where color image data is input, it is possible to use the lookup table to generate the second color data.

It is preferable that a number of specific data sets of the second color data held in the lookup table is two or fewer. In the embodiment, the lightness of color represented by the specific data set is darker than the minimum lightness. The density of the first same hue reference color in the specific data set is 0 in the embodiment. With such an embodiment, as compared to an embodiment with a greater number of data sets of second color data wherein the lightness of the represented color is darker than the minimum lightness and the density of the first same hue reference color is 0, ink of the first reference color with low lightness can be used for more areas during printing. As a result, ink consumption can be reduced further.

The plurality of the second reference colors way include two pairs of the two same hue reference colors. The first pair of the two same hue reference colors may be cyan and light cyan with higher lightness than the cyan. The second pair of the two same hue reference colors may be magenta and light magenta with higher lightness than the magenta.

The present invention can also be embodies as a printing device for carrying out printing on the basis of image data. The printing device may preferably include the above mentioned image processing device which, based on first image data in which pixel color is represented by the first color data, generates second image data in which pixel color is represented by the second color data; and a printing unit which executes printing according to the second image data using inks of the plurality of second reference colors. In this embodiment as well, ink consumption may be reduced while preserving the quality of the printed result, in the course of printing with the use of multiple types of chromatic color inks interchangeable with one another but differing in lightness.

The lookup table can be generated as follows. First, an original lookup table is prepared. The original lookup table includes first color data associated with second color data. In the original lookup table, a first same hue reference color having lower lightness among the two same hue reference colors has density of 0. Then a lookup table is generated based on the original lookup table by substituting at least a portion of densities of a second same hue reference color by densities of the first same hue reference color, for at least a portion of a plurality of data sets of specific second color data in the original lookup table. The second same hue reference color has higher lightness among the two same hue reference colors. The data sets of the specific second color data corresponds to a plurality of data sets of the first color data representing achromatic color. The data sets of the specific second color data also represent color of lower lightness than reference lightness. In this embodiment as well, a lookup table that affords reduced ink consumption while preserving the quality of the printed result can be generated by means of a simple procedure. The original lookup table will preferably be one that associates first color data and second color data representing substantially identical color.

The lookup table is preferably one such as the following. The lookup table may be a table for generating the second color data based on the first color data. The lookup table may include a first color data associated with a second color data is included in the lookup table. The first color data may be represented in terms of density of one or more first reference colors. The second color data may be represented in terms of density of a plurality of second reference colors. The plurality of second reference colors may be colors of inks used by a printing device, and include two same hue reference colors having same hue but different lightness. The first same hue reference color having lower lightness among the two same hue reference colors has density of 0, for data sets of second color data representing color of higher lightness than a reference lightness, from among a plurality of data sets of the second color data that correspond to a plurality of data sets of the first color data representing achromatic color. This lookup table can be recorded onto a computer-readable recording medium.

Substitution of first same hue reference color density for second same hue reference color density can be accomplished as follows. First, the density of the second same hue reference color is reduced. Then a density of the first same hue reference color which can reproduce a color substantially equal to a color that is to be reproduced by the reduced density of second same hue reference color, is decided as density of the first same hue reference color. By means of this embodiment, there can be generated a lookup table that affords reduced ink consumption while preserving the quality of the printed result during printing.

In the generation of the lookup table, it is preferable that, of a plurality of data sets of the second color data held in the original lookup table, the substitution is carried out for all data sets of the specific second color data representing colors of lower lightness than the reference lightness. By means of this embodiment, ink consumption can be reduced, as compared to an embodiment wherein the substitution described above is not performed for some second color data having lightness lower than the reference lightness.

The present invention can be reduced to practice in various embodiments, for example, an image processing method and an image processing device; an image data creation method and an image data creation device; a color conversion method and a color conversion device; a printing method and a printing device; a printing control method and a printing control device; a computer program for realizing the functions of such methods or devices; a recording medium having such a computer program recorded thereon; a data signal containing such a computer program and embodied in a carrier wave; and so on.

These and other objects, features, aspects, and advantages of the present invention will become more apparent from the following detailed description of the preferred embodiments with (/and) the accompanying drawings.

BRIEF DESCRIPTION OF THE DRAWINGS

FIG. 2 shows the three-dimensional lookup table 104a;

FIG. 3 is an enlarged illustration of a portion of the three-dimensional lookup table 104a;

FIG. 4 is a flowchart showing the method for generating the three-dimensional lookup table 104a;

FIG. 9 shows a partial enlargement of cyan output tone values Rc on line Lg of the three-dimensional lookup table 104a;

DETAILED DESCRIPTION OF THE INVENTION

Figure 1:
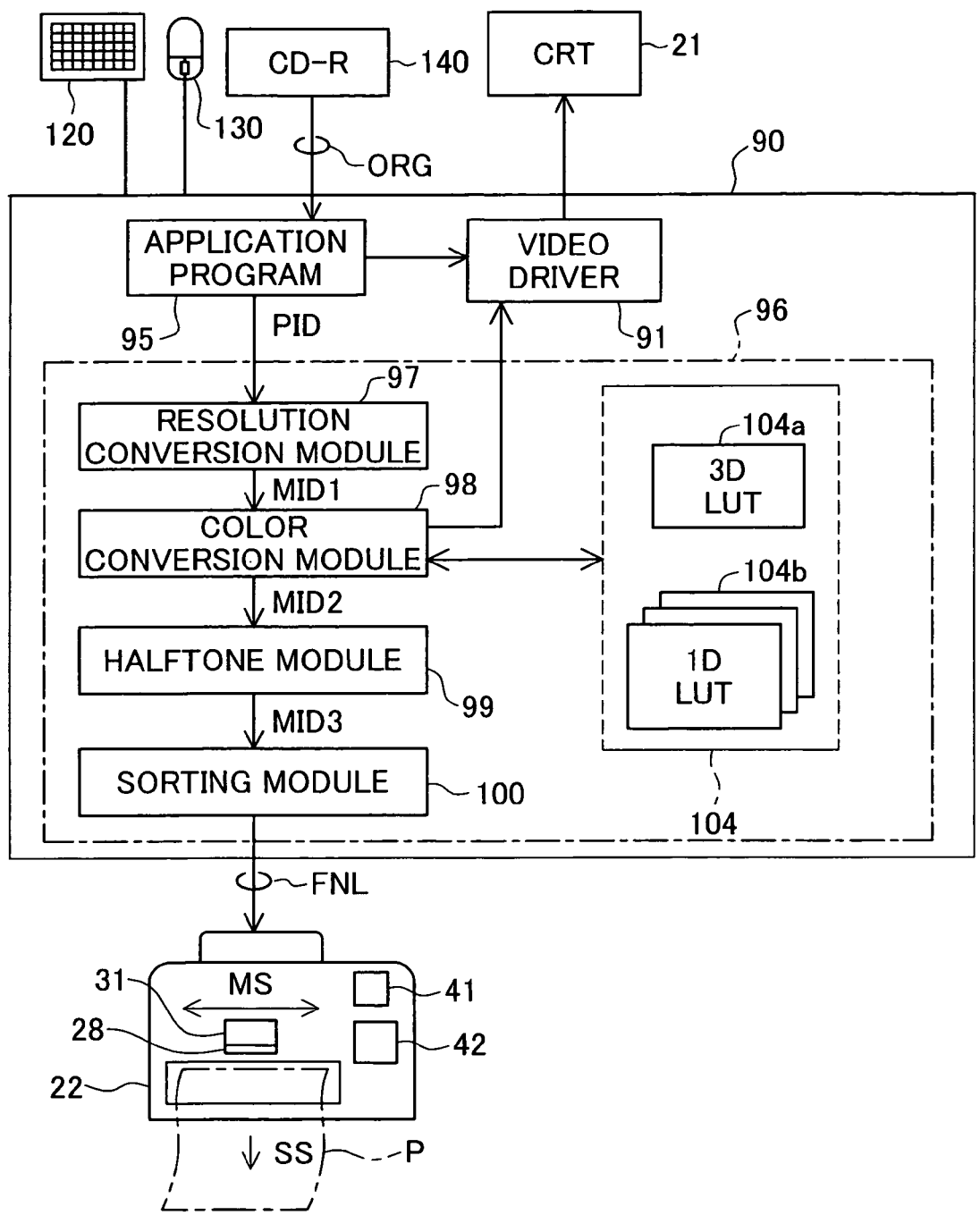
FIG. 1 is a block diagram showing the software arrangement of the printing system of Embodiment 1.

FIG. 1 is a block diagram depicting the software configuration of the printing system of Embodiment 1. On a computer 90, an application program 95 runs on a predetermined operating system. The operating system incorporates a video driver 91 and a printer driver 96.

In response to a user instruction input from a mouse 130 or a keyboard 120, the application program 95 reads from a CD-R 140 original image data ORG composed of the three color components red (R), green (G), and blue (B). Then, in response to an instruction from the user, a process such as retouching is carried out on the original image data ORG. The application program 95 displays the processed image on a CRT display 21, through the agency of the video driver 91. When the application program 95 receives a print instruction from the user, it issues a print instruction to the printer driver 96 and outputs the processed image to the printer driver 96 as preliminary image data PID.

The printer driver 96 receives the preliminary image data PID from the application program 95, and converts it to print image data FNL processable by the printer 22 (here, a multi-level signals for six colors, namely, cyan, magenta, yellow, black, light cyan, and light magenta).

In the example shown in FIG. 1, the printer driver 96 comprises a resolution conversion module 97, a color conversion module 98, a color conversion table 104, a halftone module 99, and a sorting module 100.

The resolution conversion module 97 converts the resolution of the preliminary image data PID to the resolution at which printing is carried out by the printer 22. Where the preliminary image data PID is color image data in which pixel color is represented by tone values of RGB density, the image data MID1 generated therefrom is also color image data in which pixel color is represented by tone values of RGB density. Where the preliminary image data PID is monochrome image data in which pixel color is represented by lightness only, the image data MID1 generated therefrom isalso monochrome image data in which pixel color is represented by lightness only.

Where the image data MID1 is color image data in which pixel color is represented by tone values of RGB density, the color conversion module 98 converts the image data MID1 into image data MID2 while referring to the three-dimensional lookup table 104a of the color conversion table 104. The image data MID2 is image data in which colors of pixels are represented by tone values of density of the cyan (C), magenta (M), yellow (Y), black (K), light cyan (LC), and light magenta (LM) used by the printer 22.

Where the image data MID1 is monochrome image data in which pixel color is represented by information for lightness only, the color conversion module 98 converts the image data MID1 into image data MID2 while referring to the one-dimensional lookup table 104b of the color conversion table 104.

Where the preliminary image data PID is color image data, data that identifies pixel color in the image data MID1 and that represents combinations of RGB density tone values corresponds to the "first color data". Where the preliminary image data PID is monochrome image data, data that identifies pixel color in the image data MID 1 and that represents lightness tone values corresponds to the "first color data". Data that identifies pixel color in the image data MID2 and represents combinations of density tone values of cyan, magenta, yellow, black, light cyan, and light magenta corresponds to the "second color data".

The halftone module 99 performs halftone processing on image data MID2 in which density of each color of each pixel is represented by tone values of each color, to convert the data to image data MID3 in which density of each color is represented in a format based on the dot on-off state for each pixel (also referred to as "print data" or "dot data").

The image data MID3 generated thereby is sorted by the sorting module 100 in the order in which it is sent to the printer 22, and output as final print image data FNL.

The printer 22 comprises a mechanism for feeding paper P by means of a feed motor; a mechanism for reciprocating a carriage 31 in the direction MS perpendicular to the paper P feed direction SS, by means of a carriage motor; a print head 28 riding on the carriage 31, for ejecting ink and forming dots; P-ROM 42 for storing settings data of various kinds; and a CPU 41 for controlling the paper feed motor, the carriage motor, the print head 28, the P-ROM 42, and a control panel 32. The printer 22 receives the print image data FNL, and in accordance with the print image data FNL executes printing by forming dots on the printing medium using cyan (C), magenta (M), yellow (Y), black (K), light cyan (LC), and light magenta (LM).

"Light cyan" is color of ink having the same hue as cyan, but with higher lightness than cyan. Light cyan and cyan are substitutable for one another when reproducing some colors. That is, by recording light cyan and cyan at different recording rates, it is possible to reproduce cyan components having comparable density.

"Light magenta" is color of ink having the same hue as magenta, but with higher lightness than magenta. Light magenta and magenta are substitutable for one another when reproducing some colors. That is, by recording light magenta and magenta at different recording rates, it is possible to reproduce magenta components having comparable density.

Two colors that are substitutable for one another when reproducing certain colors with ink colors are referred to herein as "same hue reference colors." Of the inks the same hue reference colors of a single pair, the ink of color with lower lightness shall be termed "dark ink" and the ink of the color with higher lightness shall be termed "light ink."

"Printing device" herein in the narrow sense indicates the printer 22, but in the broad sense represents the printing system that includes the computer 90 and the printer 22.

Figure 2:
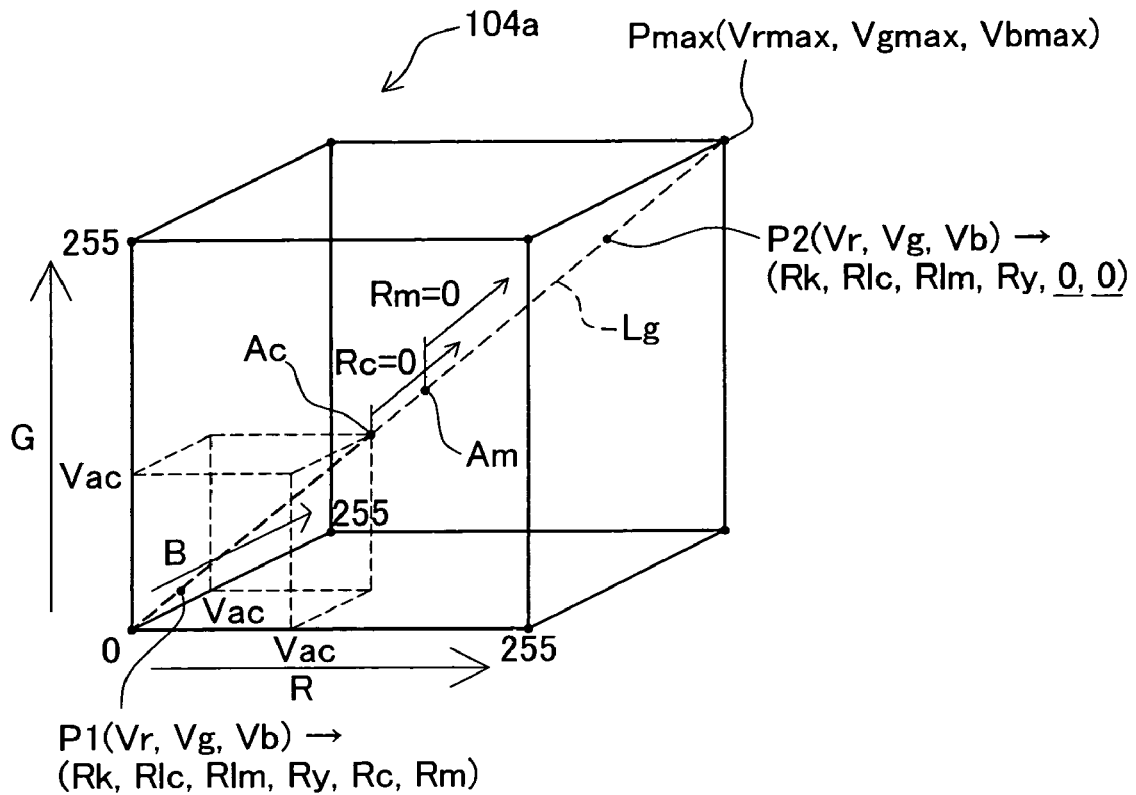

A2. Three-Dimensional Lookup Table:

(1) Arrangement of Three-Dimensional Lookup Table:

FIG. 2 illustrates the three-dimensional lookup table 104a. The three-dimensional lookup table 104a stores combinations of tone values (Vr, Vg, Vb) each representing density of the color component of the RGB color system and, in association therewith, combinations of tone values (Rk, Rlc, Rlm, Ry, Rc, Rm) each representing density of the printer ink color, i.e. black, light cyan, light magenta, yellow, cyan, and magenta (see point P1 in FIG. 2). The tone values of Vr, Vg, Vb can each assume integers from 0 to 255. The tone values of Rk, Rlc, Rlm, Ry, Rc, Rm indicate density in terms of dot recording rate of each ink, and can assume values of 0 to 100%.

Hereinbelow, the red, green and blue tone values Vr, Vg, Vb shall sometimes be referred to as "input tone values." The black, light cyan, light magenta, yellow, cyan, and magenta tone values Rk, Rlc, Rlm, Ry, Rc, Rm shall sometimes be referred to as "output tone values."

The three-dimensional lookup table 104a does not have combinations of output tone values for all possible combinations of input tone values of red, green, and blue, i.e. for (256×256×256) combinations. Instead, 17 representative values are provided for each of red, green, and blue input tone values. The three-dimensional lookup table 104a has combinations of output tone values of black, light cyan, light magenta, yellow, cyan, and magenta for combinations of these representative values of the tone values of the color components of the RGB color system, i.e. for (17×17×17) combinations.

Hereinbelow, RGB representative value combinations (Vr, Vg, Vb) shall be termed "grids." Combinations (Rk, Rlc, Rlm, Ry, Rc, Rm) of tone values of black (K), light cyan (LC), light magenta (LM), yellow (Y), cyan (C), and magenta (M) shall be termed "output tone value sets."

Figure 3:
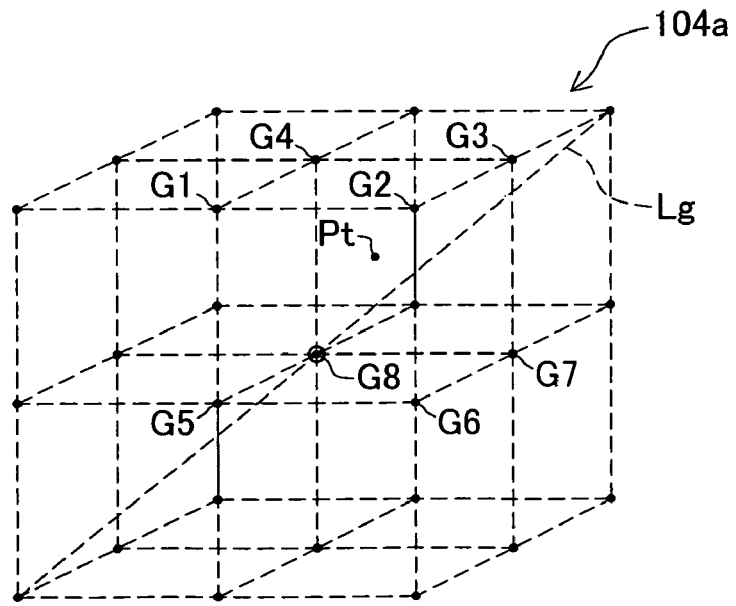

FIG. 3 is an enlarged illustration of a portion of the three-dimensional lookup table 104a. In the drawing, black points located on intersection points of the broken lines represent grids. When the color conversion module 98 (see FIG. 1) carries out color conversion for color data for which the RGB input tone value set is not located on a grid, the following process is performed. Let Pt denote the point within the coordinate system of the three-dimensional lookup table 104a, that corresponds to the color data. In the three-dimensional coordinate system of the three-dimensional lookup table 104a, the eight grids which make up the smallest rectangular parallelepiped containing point Pt inside are designated respectively as G1-G8 (see FIG. 3). When carrying out color conversion for the color data corresponding to point Pt, the color conversion module 98 uses an output tone value sets belonging to these grids G1-G8. Specifically, the color conversion module 98 performs interpolation calculations for the output tone value of each ink color, and derives an output tone value set of the color data which is targeted for color conversion.

In the RGB color system, color for which the tone values of each color component Vr, Vg, Vb are equal to one another is achromatic color. In the three-dimensional lookup table 104a (see FIG. 2), the grids (Vr, Vg, Vb) representing achromatic color are located on a straight line Lg connecting the origin O (0, 0, 0) to a point Pmax (Vrmax, Vgmax, Vbmax). Here, Vrmax, Vgmax, Vbmax are respectively the maximum values of the red, green, and blue tone values Vr, Vg, Vb. In Embodiment 1, Vrmax, Vgmax, Vbmax each have a value of 255.

In the RGB color system, of the grids located on the straight line Lg in the three-dimensional lookup table 104a, in those grids lying closer towards the origin O (0, 0, 0) than the reference point Ac shown in FIG. 2, cyan tone value (recording rate) Rc assumes a positive value. In FIG. 2, of the line Lg, the side lying closer to the origin O (0, 0, 0) than the reference point Ac is indicated by a heavy broken line. Meanwhile, of the grids on line Lg, in those grids lying further away from the origin O (0, 0, 0) than the reference point Ac, cyan tone values (recording rate) Rc are all 0 (see point P2 of FIG. 2). That is, of the grids on line Lg, in those grids lying closer to the point Pmax (Vrmax, Vgmax, Vbmax) than the reference point Ac, the color subsequent to color conversion (relatively light gray) is represented without the use of cyan.

Similarly, of the grids located on the straight line Lg in the three-dimensional lookup table 104a, in those grids lying closer towards the origin O (0, 0, 0) than the reference point Ac shown in FIG. 2, magenta tone value (recording rate) Rm assumes a positive value. Meanwhile, of the grids on line Lg, in those grids lying further away from the origin O (0, 0, 0) than the reference point Ac, magenta tone values (recording rate) Rm are all 0 (see point P2 of FIG. 2). That is, of the grids on line Lg, in those grids lying closer to the point Pmax (Vrmax, Vgmax, Vbmax) than the reference point Ac, the color subsequent to color conversion (relatively light gray) is represented without the use of magenta.

Figure 4:
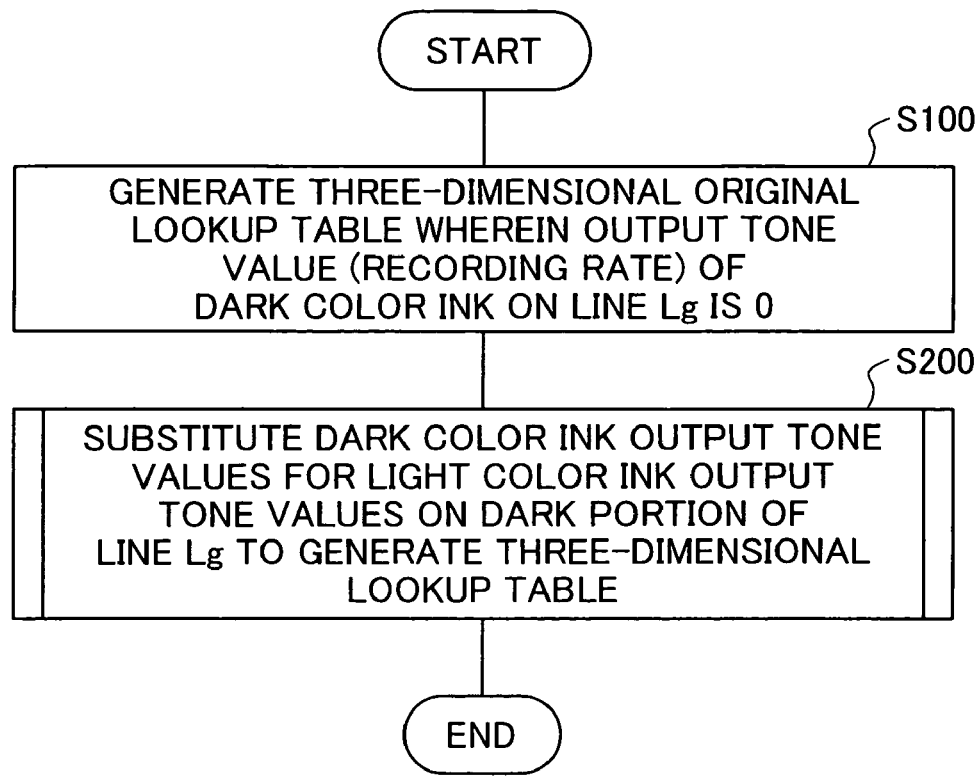

(2) Creation of Three-dimensional Lookup Table:

FIG. 4 is a flowchart of the method for generating the three-dimensional lookup table 104a. During creation of the three-dimensional lookup table 104a, first, in Step S100, a three-dimensional original lookup table 104c is generated.

Figure 5:
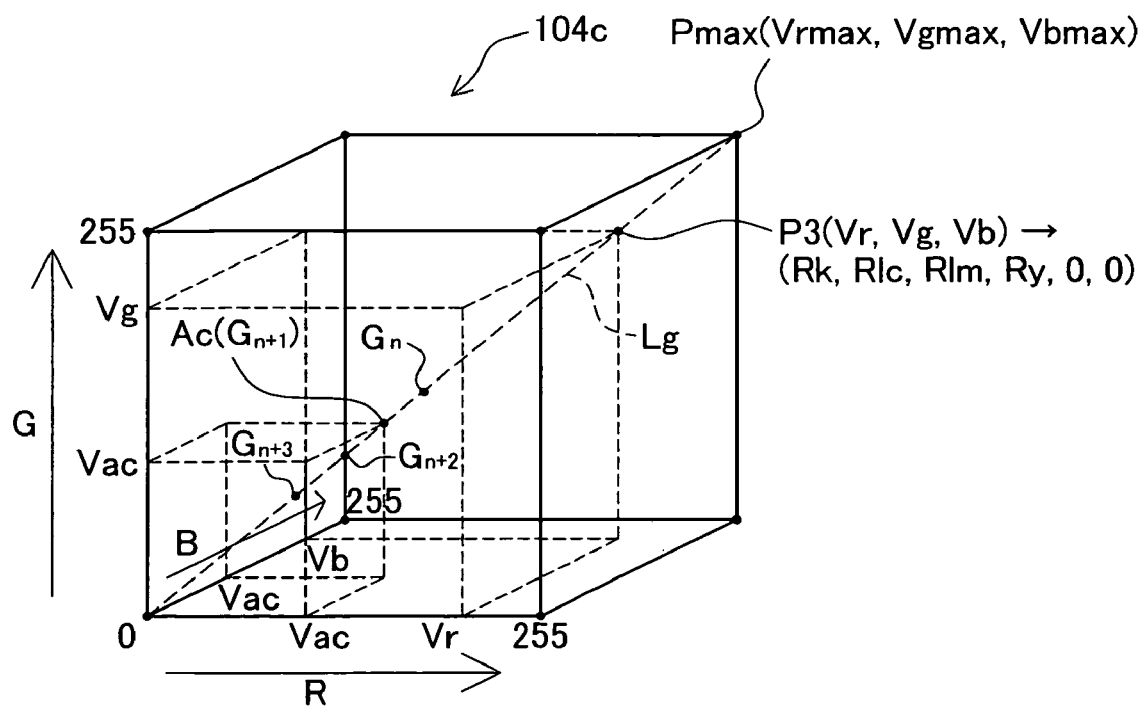
FIG. 5 illustrates the three-dimensional original lookup table 104c.

FIG. 5 is an illustration of the three-dimensional original lookup table 104c. This three-dimensional original lookup table 104c, like the three-dimensional lookup table 104a, stores combinations of RGB representative values (Vr, Vg, Vb) and, in association therewith, combinations of tone values (Rk, Rlc, Rlm, Ry, Rc, Rm) each representing density of the printer ink colors . For the three-dimensional original lookup table 104c, 33 representative values are provided for each of the tone values of red, green, and blue density. As a result, the three-dimensional original lookup table 104c has (33×33×33) grids.

In the three-dimensional original lookup table 104c, cyan recording rate Rc and magenta recording rate Rm in grids located on a straight line Lg representing achromatic color are all 0 (see point P3 of FIG. 5). The recording rates of the other colors Rk, Rlc, Rlm, Ry assume values of 0-100%. That is, the output tone value sets of grids on the straight line Lg of the three-dimensional original lookup table 104c reproduce gray of each tone with black, light cyan, light magenta, and yellow only, without using cyan or magenta. In other respects, the arrangement of the three-dimensional original lookup table 104c is the same as the three-dimensional lookup table 104a.

In Step S200 of FIG. 4, output tone values in the three-dimensional original lookup table 104c are partially revised, to generate the three-dimensional lookup table 104a. Specifically, of the grids on the line Lg held by the three-dimensional original lookup table 104c, for those grids lying closer to the origin than the reference point Ac, some of the light cyan tone values are substituted with cyan tone values. Then, in similar fashion, of the grids on the line Lg held by the three-dimensional original lookup table 104c, for those grids lying closer to the origin than the reference point Ac, some of the light magenta tone values are substituted with magenta tone values. That is, for grids representing relatively dark gray, light color ink tone values are substituted with dark color ink tone values.

Figure 6:
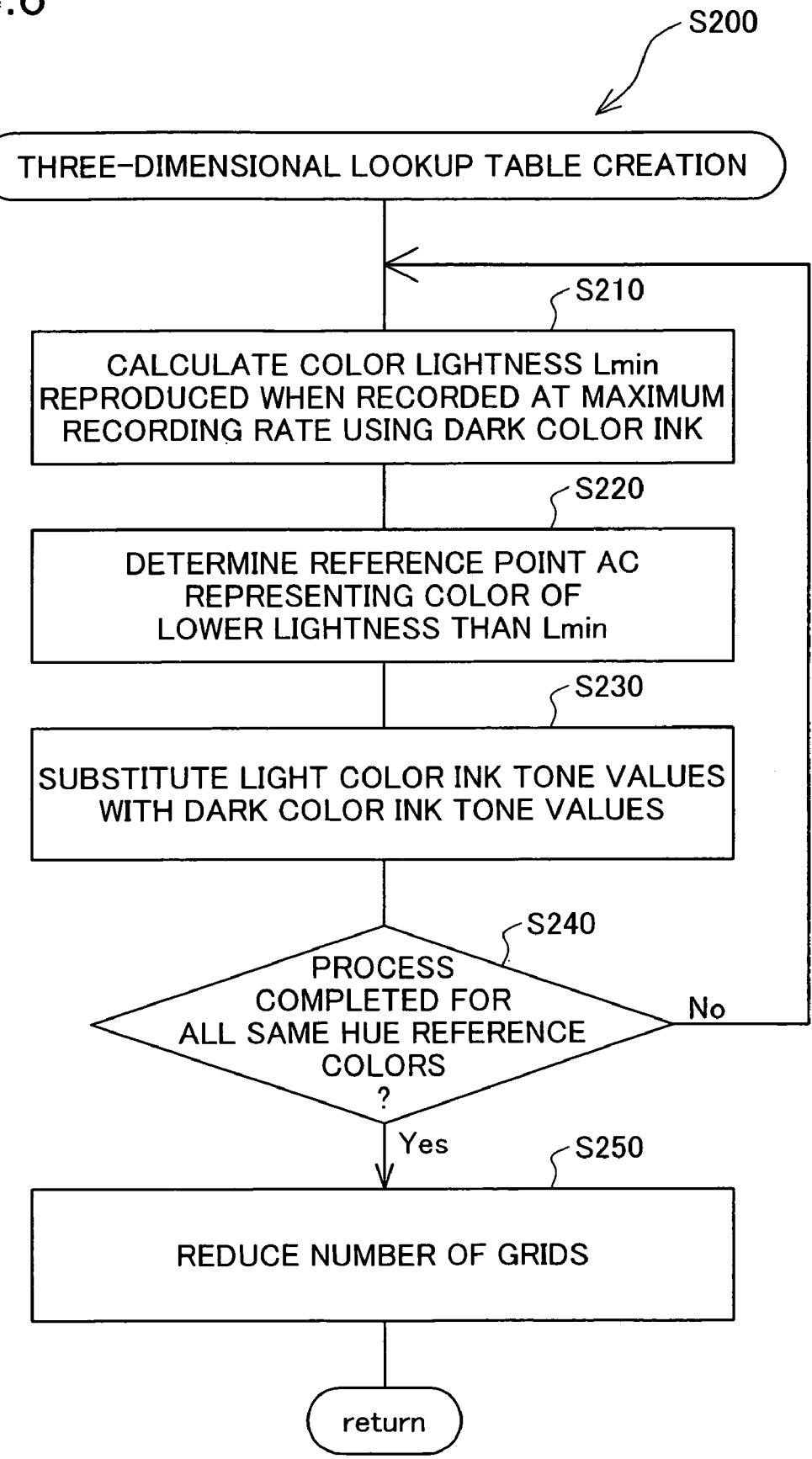
FIG. 6 is a flowchart depicting the procedure for generating the three-dimensional lookup table 104a on the basis of the three-dimensional original lookup table 104c.

FIG. 6 is a flowchart depicting the procedure for generating the three-dimensional lookup table 104a on the basis of the three-dimensional original lookup table 104c in Step S200 of FIG. 4. In Step S210, first, for the cyan ink which is the darker colored ink, color lightness Lcmin reproduced when the ink is recorded at the maximum recording rate onto the printing medium is calculated. In the flowchart of FIG. 6, the color lightness reproduced by recording at the maximum recording rate is denoted a lightness Lmin, in the both the case of cyan and the case of magenta. Where the two are to be distinguished, on the other hand, the color lightness reproduced by recording at the maximum recording rate using cyan ink is designated as Lcmin, and the color lightness reproduced by recording at the maximum recording rate using magenta ink is designated as Lmmin.

Figure 7:
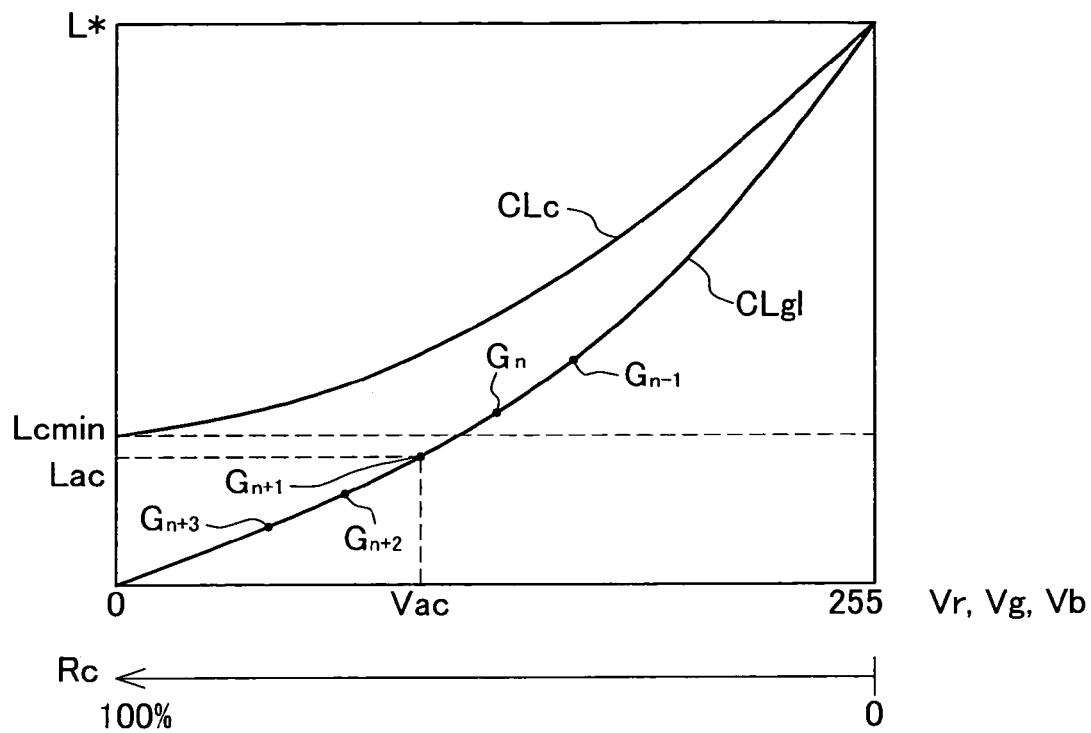
FIG. 7 illustrates the method for determining the reference point Ac on the basis of the minimum lightness of cyan ink Lcmin.

FIG. 7 shows the method for determining the reference point Ac (see FIG. 2) on the basis of the minimum lightness of cyan ink Lcmin. The horizontal axis in the drawing indicates the value (0-225) of the input tone values Vr, Vg, Vb of grids on the line Lg in the three-dimensional original lookup table 104c. In grids lying on the line Lg, the three input tone values Vr, Vg, Vb coincide. The vertical axis, on the other hand, indicates lightness. Specifically, it represents L* in the L*a*b* color system. The graph CLgl represents color (gray) lightness in grids lying on the line Lg. The number of grids lying on line Lg belonging to the three-dimensional original lookup table 104c is 33. That is, color lightness represented by the grids should actually be represented by 33 points in FIG. 7. Some of the grids lying on the line Lg are indicated in FIG. 7 by the points $G_{n-1}$, $G_n$, $G_{n+1}$, $G_{n+2}$, $G_{n+3}$. The intervals among these points $G_{n-1}$, $G_n$, $G_{n+1}$, $G_{n+2}$, $G_{n+3}$ in the drawing do not reflect the intervals among the actual representative values.

The cyan recording rate Rc is also indicated on the horizontal axis in FIG. 7. In FIG. 7, the cyan recording rate is higher moving to the left. The graph CLc represents color lightness from white (a recording rate of 0) to the maximum density cyan (100% recording rate) represented at each cyan recording rate Rc. When the cyan recording rate Rc is at maximum (100%), the maximum cyan density lightness represented by cyan ink on the printing medium is Lcmin (see Step S210 of FIG. 6).

Next, in Step S220 of FIG. 6, there is determined a reference point Ac that, of the grids lying on the line Lg of the three-dimensional original lookup table 104c and representing color of lower lightness than the lightness Lcmin, is the grid representing the color of highest lightness. In the flowchart of FIG. 6, this reference point is denoted as reference point A, both in the case of cyan and the case of magenta. Where the two are to be distinguished, on the other hand, the cyan reference point is denoted as reference point Ac, while the magenta reference point is denoted as reference point Am (see FIG. 2).

The grids $G_n$ and $G_{n+1}$ shown in FIG. 7 are neighboring grids on line Lg of the three-dimensional original lookup table 104c (see FIG. 5). The lightness of the gray represented by the output tone value set (Rk, Rlc, Rlm, Ry, Rc, Rm) of grid $G_n$ is a value higher than Lcmin. On the other hand, the lightness of the gray represented by the output tone value set of grid $G_{n+1}$ is a value lower than Lcmin. In Step S220 of FIG. 6, the grid $G_{n+1}$ that meets this condition is designated as the reference point Ac. The input tone value of this grid $G_{n+1}$, namely, of the cyan reference point Ac, is denoted as Vac. The lightness of the cyan reference point Ac is termed the reference lightness Lac.

The minimum lightness Lcmin can be derived using a printing device to print onto the printing medium in accordance with the maximum recording rate for cyan (Rc=100%), and measuring the printed output with a colorimeter. The lightness of the gray represented by the output tone value set (Rk, Rlc, Rlm, Ry, Rc, Rm) of each grid can be derived by the following procedure. That is, using a printing device, printing is carried out onto a printing medium identical to the printing medium used for colorimetry of minimum lightness Lcmin discussed above in accordance with the output tone value set of the grid. Then the printed output is measured with a colorimeter.

In Step S230 of FIG. 6, for grids lying on the line Lg of the three-dimensional original lookup table 104c and situated in the area having smaller input tone values than the input tone value Vcm of the reference point Ac, cyan tone values are determined while substituting some light cyan recording rates with cyan recording rates. In the coordinate system of the three-dimensional original lookup table 104c (see FIG. 5), lightness is higher further away from the origin O (0, 0, 0). Thus, in Step S230, light cyan recording rates are substituted with cyan recording rates for grids on line Lg, which are closer to the origin O than the reference point Ac.

Figure 8:
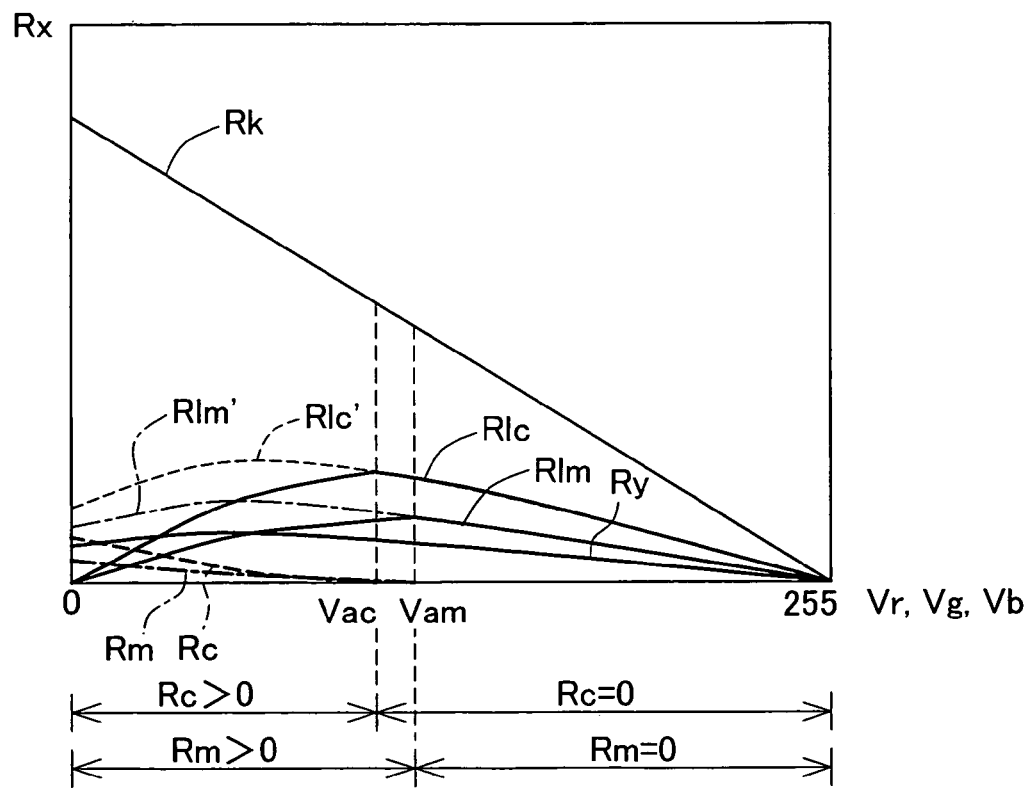
FIG. 8 shows the value Rx of the output tone values Rk, Rlc, Rlm, Ry, Rc, Rm of each ink color in grids lying on line Lg representing achromatic color.

FIG. 8 is a graph depicting the value Rx of the output tone values Rk, Rlc, Rlm, Ry, Rc, Rm of each ink color in the grids lying on line Lg representing achromatic color in the three-dimensional original lookup table 104c and the three-dimensional lookup table 104a. In actuality, the output tone values of each ink color should be represented by multiple points corresponding to the grids in FIG. 8. In FIG. 8, however, output tone values of ink colors are depicted as approximated by a curve.

In FIG. 8, the black recording rate Rk decreases as the input tone values Vr, Vg, Vb increase. That is, the brighter the color of the gray to be represented is, the lower the black recording rate Rk is.

In FIG. 8, the graph Rlc' indicated by the thin broken line is the recording rate of light cyan ink in grids lying on line Lg in the three-dimensional original lookup table 104c. The graph Rlc represented by the solid line, on the other hand, is the recording rate of light cyan ink in grids lying on line Lg in the three-dimensional lookup table 104a generated on the basis of the three-dimensional original lookup table 104c. The graph Rc represented by the heavy broken line is the recording rate of cyan ink in grids lying on line Lg in the three-dimensional lookup table 104a. The cyan ink recording rate Rc in grids lying on line Lg in the three-dimensional original lookup table 104c is consistently 0. Thus, the cyan recording rate Rc in grids lying on line Lg in the three-dimensional original lookup table 104c is not represented in FIG. 8.

In Step S230 of FIG. 6, in the range of 0-Vac for input tone values Vr, Vg, Vb, the light cyan recording rate is substituted by the cyan recording rate. Specifically, the light cyan recording rate (tone values) is reduced. As a result, in the range of 0-Vac for input tone values Vr, Vg, Vb in FIG. 8, the light cyan graph Rlc of the three-dimensional lookup table 104a is below the light cyan graph Rlc' of the three-dimensional original lookup table 104c.

Meanwhile, the cyan recording rate able to represent a cyan component substantially equivalent to the extent of decrease of the light cyan recording rate is designated as the cyan tone value. As a result, in the range of 0-Vac for input tone values Vr, Vg, Vb in FIG. 8, the cyan graph Rc of the three-dimensional lookup table 104a assumes positive values (see the bottom in FIG. 8); Where the input tone values Vr, Vg, Vb are greater than Vac, the cyan recording rate Rc of the three-dimensional lookup table 104a is 0.

As is appreciated from that fact that values continue to be positive in the range of 0-Vac for the light cyan graph Rlc of the three-dimensional lookup table 104a in FIG. 8, in Step S230, it is not the case that light cyan recording rates are all substituted by cyan recording rates. The proportion of substitution to cyan recording rates in the light cyan recording rates increases with smaller input tone values Vr, Vg, Vb (moving leftward in FIG. 8). Where the input tone value Vr, Vg, Vb is 0, i.e. at left edge of FIG. 8, the proportion of substitution from light cyan to cyan recording rate is 100%.

When the input tone value Vr, Vg, Vb is Vac, the proportion of substitution from light cyan to cyan recording rate is 0. As a result, the graph Rlc is 0 when the input tone value Vr, Vg, Vb is 0, and is coincident with the graph Rlc' when the input tone value Vr, Vg, Vb is Vac. In Step S230 of FIG. 6, tone values for cyan, which is dark ink, are determined in this way.

In Step S240 of FIG. 6, it is decided whether tone value determination (Step S230) has been completed for all pairs of same hue reference color of the three-dimensional lookup table 104a (i.e. light cyan and cyan, and light magenta and magenta). If tone values have not yet been determined for light magenta and magenta, the process goes back to Step S210. Then, in the process beginning at Step S210, tone values Rlm, Rm of light magenta and magenta of the three-dimensional lookup table 104a are determined.

For light magenta and magenta, the tone values Rlm, Rm are determined in the same manner as for light cyan and cyan. Specifically, first, with the magenta recording rate at maximum (100%), the lightness Lmmin of maximum density magenta represented with magenta ink on the printing medium is derived (Step S210 of FIG. 6). Then, of the grids lying on line Lg with represented color lower than Lmmin, the grid having the highest lightness of represented color is derived. That is, the reference point Am is derived (Step S220). Then, for grids in the area of input tone values smaller than the input tone value Vam of the reference point Am, the light magenta recording rates are partially substituted with magenta recording rates (Step S230).

By means of the above process, the light magenta recording rate Rlm and the magenta recording rate Rm are determined in the manner shown in FIG. 8. In the range of 0-Vam for input tone values, the magenta graph Rm of the three-dimensional lookup table 104a indicated by the heavy dot-and-dash line in FIG. 8 assumes positive values (see the bottom in FIG. 8), The magenta recording rate Rc of the three-dimensional lookup table 104a is 0 when input tone values Vr, Vg, Vb are greater than Vam.

In Step S240 of FIG. 6, it is decided whether tone values have been determined for cyan and magenta. In the event that tone values have been determined for cyan and magenta, the process moves on to Step S250.

The number of grids of the three-dimensional lookup table 104a generated on the basis of the three-dimensional original lookup table 104c in the process up to Step S240 is the same as that of the three-dimensional original lookup table 104c, namely, (33×33×33). In Step S250, the number of grids of the three-dimensional lookup table 104a is reduced from (33×33×33) to (17×17×17). Specifically, from the grids of the three-dimensional original lookup table 104c, every other grid, including the grids at each end of line Lg, are selected. The process of Step S200 for generating the three-dimensional lookup table 104a then ends. In this way, the printer driver 96 (FIG. 1) is supplied with a three-dimensional lookup table 104a with a smaller amount of data than the three-dimensional original lookup table 104c.

In the above manner, in Step S200 of FIG. 4, for grids lying on line Lg of the three-dimensional original lookup table 104c and located in the area of small input tone values, tone values (recording rates) of light cyan and light magenta are reduced, and tone values (recording rates) of cyan and magenta are determined as positive values representing ink color components approximately equal to the extent of decrease in the light color ink tone values, to generate the three-dimensional lookup table 104a. As a result, the three-dimensional lookup table 104a generated in this way is a lookup table wherein, for grids lying on the straight line Lg representing achromatic color and located in the area of input tone values greater than the reference point Ac, the cyan tone value Rc is 0 (see FIG. 2). For grids lying on the line Lg and located in the area of input tone values greater than the reference point Am, the magenta tone value Rm is 0 as well.

This three-dimensional lookup table 104a has the following advantages. For areas of higher lightness than the reference point Ac, in monochrome printing, cyan ink is not used, with light cyan ink being used instead. Thus, in the light portions of a printed image, formation of high density cyan dots resulting in grainy appearance is avoided.

For areas of lower lightness than the reference point Ac, on the other hand, in monochrome printing, high density cyan ink is used in place of part of the low density light cyan ink. Thus, less light cyan ink can be used, as compared to the case where only light cyan ink is used. High density cyan ink can be substituted for a greater amount of light cyan ink producing the same color. Thus, by using cyan ink, it is possible to reduce ink consumption overall.

In an image printed by monochrome printing, the portion in which cyan ink is used in place of light cyan ink is portions of lightness lower than the maximum density cyan lightness Lcmin. That is, in such portion, the lightness of the gray reproduced overall by dots of each ink is lower than the maximum density cyan lightness Lcmin. As a result, in those areas, there may be no visible difference between portions recorded with cyan dots, and adjacent portions not having cyan dots recorded in them. Thus, the printed image rarely has any noticeable cyan dot graininess. That is, in monochrome printing, despite the use of dots of cyan which is a dark colored ink, degradation of quality of printed results is kept to a minimum.

Figure 9:
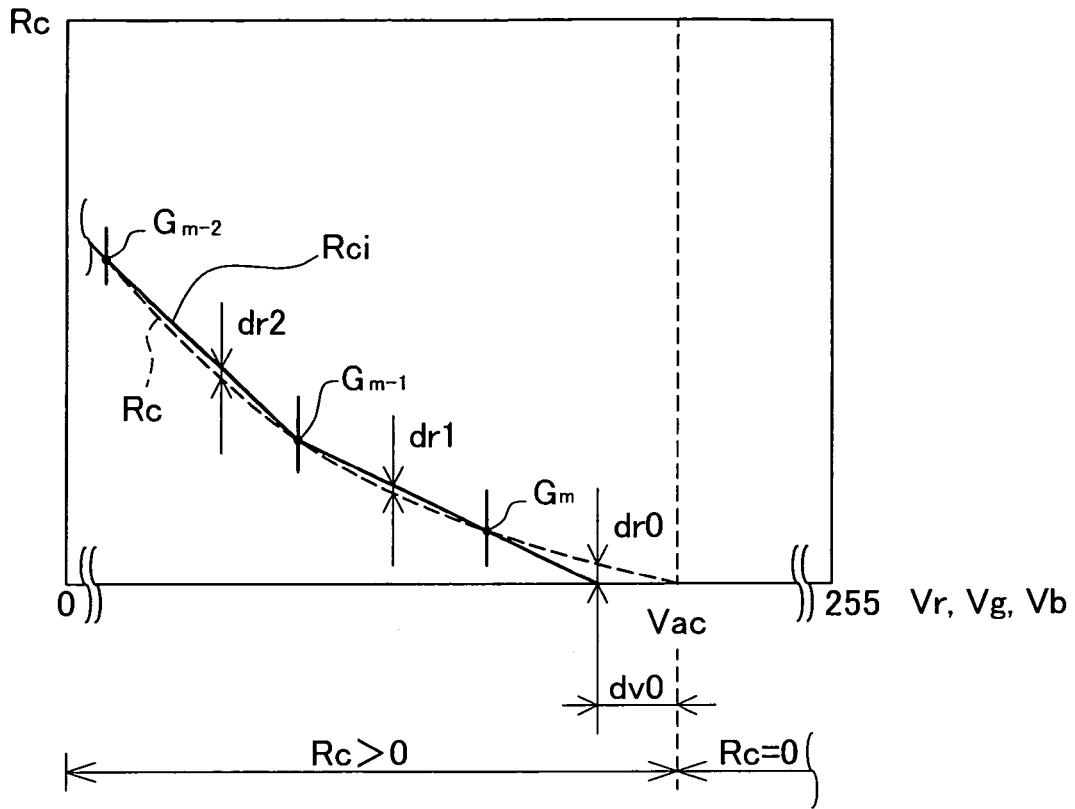

FIG. 9 is a graph depicting a partial enlargement of cyan output tone values Rc on line Lg of the three-dimensional lookup table 104a. In FIG. 9, the horizontal axis indicates values (0-255) of input tone values Vr, Vg, Vb in grids lying on line Lg of the three-dimensional lookup table 104a. The vertical axis indicates cyan output tone values Rc. FIG. 9 shows cyan output tone values Rc are shown for part of the area having input tone values smaller than Vac.

The curve indicated by the broken line in FIG. 9 is a curve indicating output tone values Rc in the case where all input tone values from 1 to 255 have output tone values Rc. On the other hand, the collection Rci of segments connecting points the $G_m$, $G_{m-1}$, and $G_{m-2}$ constitutes a line indicating output tone values Rci derived by linear interpolation between output tone values of the 17 representative values for the output tone values Rc. For the range of input tone values greater than the point $G_m$ of the greatest representative value, values on a straight line obtained by extending the straight line derived by connecting the points $G_m$ and $G_{m-1}$ are used as-is for input tone values. As a result, whereas originally, at the input tone value of Vac the output tone value would be expected to be 0, the output tone value is instead 0 at an input tone value smaller than Vac, by dv0. Similarly, for the range of input tone values smaller than the smallest representative value point $G_1$ as well, the straight line derived by connecting the points $G_1$ and $G_2$ is extended, and values lying on the line are used as the input tone values.

The actual printer driver 96 stores cyan output tone values for the 17 input tone value representative values only. During printing, output tone values Rci derived by interpolation therefrom are used as the output tone values. Thus, as indicated by dr0-dr2 in FIG. 9, there is a shift from the original output tone values Rc. When such shift in output tone value occurs for a given ink, there may be color deviation from the target color in the printed result. For example, when representing achromatic color, some coloration may appear. In Embodiment 1, interpolation is carried out in three dimensions as shown in FIG. 3; however, in order to simplify the description, it is here assumed that linear interpolation in one dimension is carried out. The fact that carrying out interpolation results in deviation from ideal values is the same in both three-dimensional interpolation and one-dimensional interpolation.

In this embodiment, the area in which output tone value shift for cyan ink due to interpolation occurs is the area where cyan ink is used, namely, the area of input tone values smaller than Vac. In other words, in an image, it is the portion of lightness lower than the maximum density cyan lightness Lcmin. Thus, despite the occurrence of a modicum of color shift during printing caused by linear interpolation, it is not be readily noticeable.

More specifically, in this embodiment, the fact that degradation of picture quality of printed results is not readily noticeable is thought to be for the following reason. First, typically, due to the characteristics of the human visual sense, color shift occurring in darker areas is not readily noticeable. Also, in dark areas, variability in ink values (output tone values) tends not to affect color values.

Figure 10:
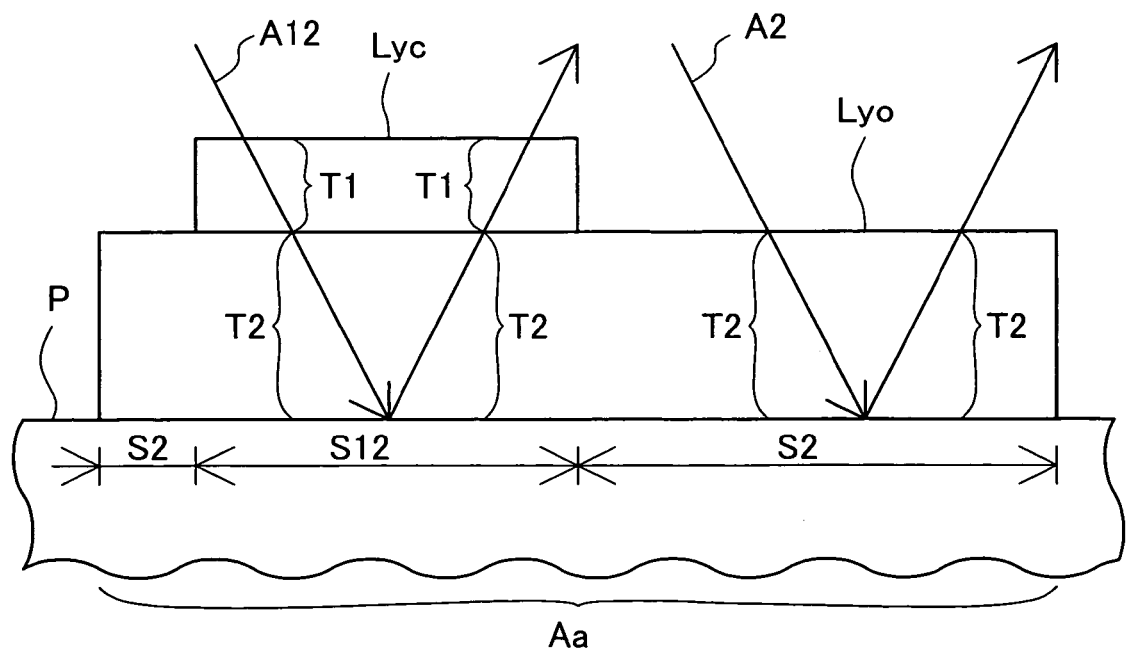
FIG. 10 shows sectional view depicting transmissivity of light in a portion Aa representing a given color on printing paper P.

FIG. 10 is a model sectional view depicting transmissivity of light in a portion Aa representing a given color. FIG. 10 depicts in model form a discrete layer Lyo of non-cyan ink and a layer Lyc of cyan ink recorded onto printing paper P. The light transmissivity of the cyan ink layer Lyc is denoted as T1, and the light transmissivity of the non-cyan ink layer Lyo is denoted as T2. In portions recorded with cyan ink, the transmissivity of light A12 reflected back from the printing paper P is $(T1^2 \times T2^2)$. In portions where cyan ink is not recorded, on the other hand, the transmissivity of light A2 reflected back from the printing paper P is (T2²).

Here, where the proportion of the surface area of the portion of the printing paper P having cyan ink recorded thereon is denoted as S2, the light transmissivity T of the entire portion Aa shown in FIG. 10 is given by the following Equation (1).

[Eq. 1]
$$T = \frac{S12 \times (T1^2 \times T2^2) + S2 \times T2^2}{S12 + S2}$$
$$= \frac{(S12 \times T1^2 + S2) \times T2^2}{S12 + S2}$$
(1)

Let it now be assumed that shifting of cyan ink output tone values has occurred, and that as a result the proportion of the surface area of the portion of the printing paper P having cyan ink recorded thereon is now (S12+ΔS) and the proportion of the surface area of the portion of the printing paper P not having cyan ink recorded thereon is now (S2−ΔS). the light transmissivity (T+ΔT) of the entire portion Aa shown in FIG. 10 is now represented by the following Equation (2).

[Eq. 2]
$$T + \Delta T = \frac{\{(S12 + \Delta S) \times T1^2 + (S2 - \Delta S)\}}{(S12 + \Delta S) + (S2 - \Delta S)} \times T2^2$$
$$= T + \frac{(T1^2 - 1)}{S12 + S2} \times T2^2 \times \Delta S$$
(2)

In Equation (2), the second term is the shift in light transmissivity ΔT. The second term of Equation (2) assumes smaller values with smaller light transmissivity T2 of the non-cyan ink layer. The light transmissivity T2 of the non-cyan ink layer is sufficiently low in the area darker than the color lightness Lcmin reproduced when the cyan ink is recorded at the maximum recording rate onto the printing medium. In the area, despite the shift in output tone values of the cyan ink, the shift of light transmissivity occurring as a result is sufficiently low. As a result, degradation of picture quality of the printed result is not readily apparent to the human eye.

Advantages analogous to the advantages for cyan ink discussed above are obtained in relation to the use of magenta ink as well. That is, according to the three-dimensional lookup table 104a, magenta dots are used for portions of lightness lower than the maximum density magenta lightness Lmmin. Thus, the amount used of light magenta ink, which is a light colored ink, can be reduced while holding degradation of picture quality of the printed result to a minimum.

The color conversion module 98, when carrying out color conversion with reference to the three-dimensional lookup table 104a, carries out color conversion of the target color data while interpolating output tone values of the plurality of grids (see FIG. 3). Accordingly, even in case where the preliminary image data PID received by the printer driver 96 is not purely achromatic color image data having only color data in which Vr=Vg=Vb, but is instead colored, dark color ink may be used in the converted data.

Specifically, in the example of FIG. 3, where a grid G8 lying on the straight line Lg representing achromatic color has a positive value as the cyan tone value, the positive value is considered in the interpolation calculation during determination of the output tone values of the color data of a point Pt targeted for color conversion. Thus, positive non-zero output tone values will be determined even in the output tone value set of the color data of the point Pt. Consequently, where pixel color data corresponds to points in proximity to the straight line Lg representing achromatic color, dark color ink is used instead of some of the light color ink, and as a result less ink is used, without any drop in quality of the printed result.

B. Embodiment 2:

The description of Embodiment 1 focused mainly on the three-dimensional lookup table 104a. However, a lookup table having a recording rate of 0 of dark color ink for the area of gray lighter than the reference points Ac, Am can be realized as a one-dimensional lookup table 104b for use in monochrome printing.

Figure 11:
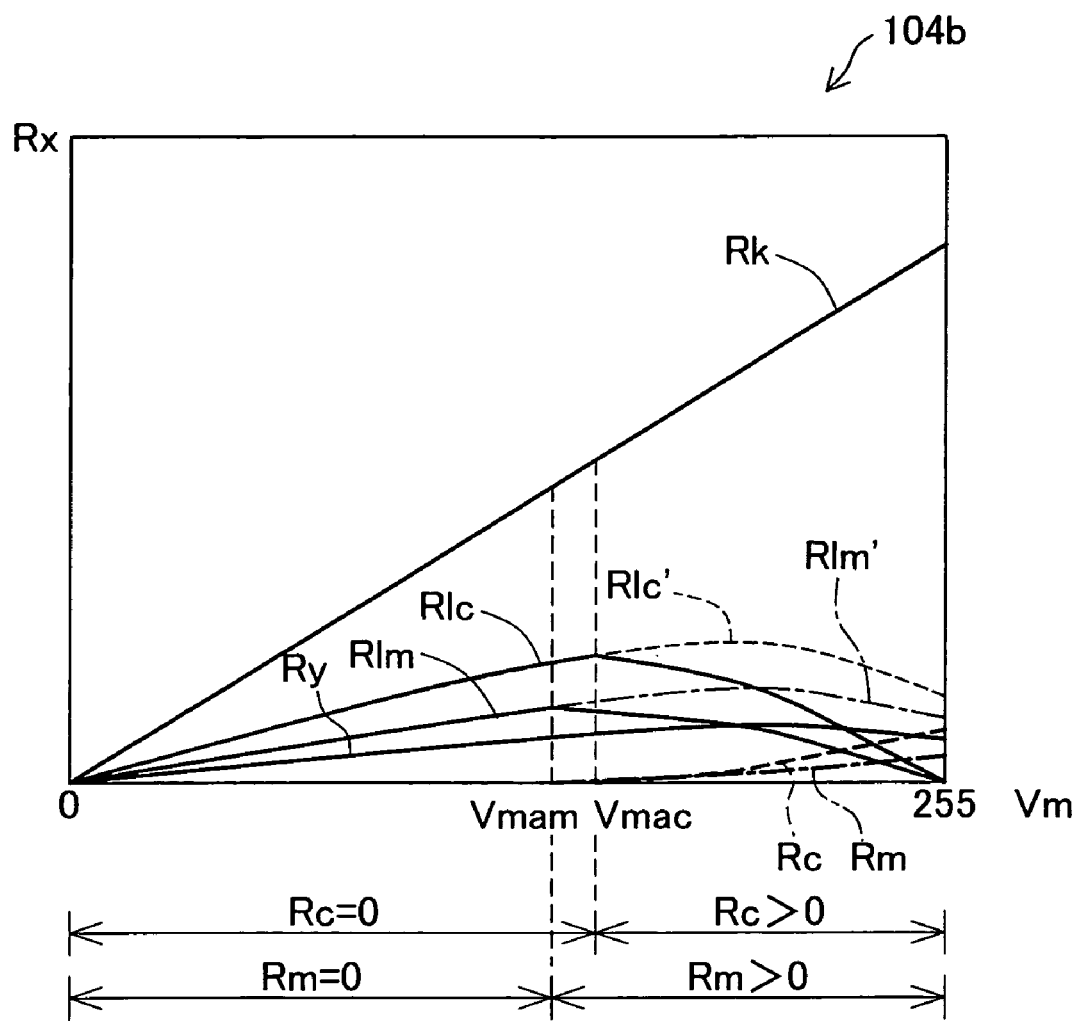
FIG. 11 shows the one-dimensional lookup table 104b.

FIG. 11 shows the one-dimensional lookup table 104b (see FIG. 1). The one-dimensional lookup table 104b is referred to in printing of monochrome images in which pixel color is represented by lightness information only. The horizontal axis in the drawing is the input tone value Vm representing gray density in monochrome image data. In monochrome image data the input tone value Vm can assume values of 0 to 255. The color represented by the input tone value Vm=0 is white. The color represented by the input tone value Vm=255 is black.

In FIG. 11, Vmac is the tone value that represents gray of lightness equal to the color lightness Lac represented by the reference point Ac (see FIG. 7). That is, when the input tone value Vm is greater than Vmac, the reproduced gray will be gray of lower lightness than the cyan minimum lightness Lcmin. Vmam, on the other hand, is the tone value that represents gray of lightness equal to the lightness in the reference point Am. That is, when the input tone value Vm is greater than Vmam, the reproduced gray will be gray of lower lightness than the magenta minimum lightness Lmmin. The other drawing symbols in FIG. 11 are the same as those in FIG. 8.

During printing of a monochrome image in which pixel color is represented by lightness information only, the color conversion module 98, while referring to the one-dimensional lookup table 104b, converts the monochrome image data MID1 to image data MID2 wherein colors of pixels are represented by tone values of cyan (C), magenta (M), yellow (Y), black (K), light cyan (LC), and light magenta (LM).

In FIG. 11, for the 0-Vmac range of gray input tone values, the cyan recording rate Rc is 0. For the range of gray input tone values greater than Vmac, the cyan recording rate Rc assumes positive values as shown by the heavy broken line. For the 0-Vmam range of gray input tone values, the magenta recording rate Rm is 0. For the range of gray input tone values greater than Vmam, the magenta recording rate Rm assumes positive values as shown by the heavy dot-and-dash line.

According to the one-dimensional lookup table 104b, even during printing of monochrome images in which pixel color is represented by lightness information only, cyan dots are used for the portion having lightness lower than the maximum density cyan lightness Lcmin (Vm=Vmac−255). Magenta dots are used for the portion having lightness lower than the maximum density magenta lightness Lmmin (Vm=Vmam−255). Consequently, the amounts of light cyan and light magenta ink used can be reduced, while holding degradation of quality of the printed result to a minimum.

This one-dimensional lookup table 104b, as with the three-dimensional lookup table 104a, can be generated on the basis of the three-dimensional original lookup table 104c by the procedure of FIG. 4 and FIG. 6. However, reduction of the number of grids of Step S250 is not carried out. Also, representative values of gray input tone values Vm are determined which correspond respectively to the representative values of the input tone values Vr, Vg, Vb of the RGB color system. The gray input tone values Vm are the associated with tone values of each ink color, and held in the one-dimensional lookup table 104*b*.

Here, since the representative values of gray input tone values Vm correspond to the representative values of the input tone values Vr, Vg, Vb used in the three-dimensional original lookup table 104*c*, the number of representative values of the input tone values is 33. Since a one-dimensional lookup table has a smaller amount of information than a three-dimensional lookup table. Accordingly, even where the values ranging from white to black are more numerous than in a three-dimensional lookup table, when the one-dimensional lookup table is equipped to the printer driver, the amount of the data of the lookup table will not be a problem.

C. Variations:

The invention is not limited to the embodiments described hereinabove, and may be reduced to practice in various other forms without departing from the spirit thereof, such as the following variations.

C1. Variation 1:

In the preceding embodiments, the interchangeable inks are light cyan and cyan, and light magenta and magenta. However, a plurality of ink colors interchangeable with one another for other color components may be provided as well. For example, yellow, and dark yellow having the same hue as yellow but lower lightness, could be used as the ink color. Similarly, light color ink and dark color ink could be provided for ink colors such as red, green, or violet.

The area in which the output tone value representing recording density of dark color ink in an output tone value set is 0 can be determined as follows. Data conversion of color data is carried out according to the model of the printing device for printing the converted data. Thus, using a model of printing device, printing is first carried out onto the printing medium in accordance with the maximum recording rate of dark color ink (Rc=100%). The printed result is then subjected to colorimetric measurement, to ascertain the minimum lightness of the dark color ink Lmin. To color data whose reproduced color lightness is higher than Lmin, there is assigned an output tone value set wherein the value for the recording density for that dark color ink is 0. On the other hand, to color data whose reproduced color lightness is lower than Lmin, there is assigned an output tone value set wherein the value for the recording density for that dark color ink is a positive value.

The plurality of ink colors interchangeable for a given color component is not limited to two, and may be three or more. For example, for the cyan color component, it would be possible to provide three colors, namely, (1) cyan, (2) light cyan having the same hue as cyan but higher lightness than cyan, and (3) super light cyan having the same hue as cyan but higher lightness than light cyan. This applies to the magenta and yellow color components as well.

Similarly, whereas in the preceding embodiments, there was only one color of achromatic color ink, i.e. black, several achromatic color inks of different lightness could be used as well. For example, printing could be carried out by varying the ratio of recording rates of black, gray that is an achromatic color of higher lightness than black, and light gray that is an achromatic color of higher lightness than gray, depending on input tone values. In such an embodiment as well, the same hue reference colors, which are chromatic color inks, can be used in addition to achromatic color ink in the manner of Embodiment 1 and Embodiment 2.

C2. Variation 2:

In Embodiment 1, the reference point A—which divides the range in which dark color ink is used from the range in which it is not used—and the reference lightness La which represents the lightness of the reference point A, are determined as follows. Specifically, of the grids representing achromatic color in the three-dimensional original lookup table 104*c* and reproducing color of lower lightness than the minimum lightness Lmin of dark ink, the grid $G_{n+1}$ that reproduces the color with highest lightness is designated as the reference point A (see FIG. 7). However, the reference point A may instead be another grid $G_n$ or $G_{n-1}$ that reproduces color of higher lightness. In preferred practice, however, the grid will represent color of lightness not exceeding 110% of the minimum lightness Lmin. For the range above 110% of the minimum lightness Lmin, printed results using dark ink tend to have readily noticeable graininess.

In preferred practice, the reference point A will be a grid representing color of lightness equal to or less than the minimum lightness Lmin. That is, in preferred practice the reference lightness La for a given dark color ink is lightness that is moderately brighter, i.e. no more than 110%, of the minimum lightness Lmin for that dark color ink; more preferably, it will be a lightness equal to or less than the minimum lightness Lmin. In preferred practice, reference point A is a grid representing achromatic color of lightness not exceeding 110% of the minimum lightness Lmin, and more preferably a grid representing achromatic color of lightness equal to or less than the minimum lightness Lmin.

However, it is yet more preferable that the reference point A relating to a given same hue reference color is the point as follows. That is, the reference point A is grid $G_{n+1}$, $G_{n+2}$ or $G_{n+3}$ which reproduces color of lower lightness than the minimum lightness Lmin of dark color ink of the same hue reference color, in the three-dimensional original lookup table 104*c*. The grid $G_{n+1}$, $G_{n+2}$ and $G_{n+3}$ are also the grids representing achromatic color reproducing color having the first to third highest lightness (see FIG. 5 and FIG. 7). It is still more preferable for the for the reference point A to be grid $G_{n+1}$ or $G_{n+2}$ which, of the grids reproducing color of lower lightness than the minimum lightness Lmin of dark ink, are the grids having the first or second highest lightness. By means of this embodiment, dark color ink can be used for color data of even higher lightness, providing greater ink savings.

In other words, in the lookup table, of the grids whose reproduced color lightness is of lower lightness than the minimum lightness Lmin of dark color ink (in FIG. 7, $G_{n+1}$, $G_{n+2}$ or $G_{n+3}$), grids whose dark color ink recording rate is 0 preferably number three or fewer, and more preferably one or two.

C3. Variation 3:

In the embodiments hereinabove, the input tone values Vr, Vg, Vb of image data represented in the RGB color system are integral values of 0-255. Input tone values Vm of monochrome image data in which pixel color is represented by lightness only are also integral values of 0-255. The output tone values Rk, Rlc, Rlm, Ry, Rc, Rm representing ink recording density assume values of 0 to 100%. However, these tone values could be established with other numerical ranges instead. That is, provided that the tone values are able to represent density of each color, any numerical range may be employed. Tone values may be such that lower lightness is associated with greater numerical values, or higher lightness is associated with greater numerical values. The lookup table may be a table designed such that, for a set of densities of a plurality of second reference colors corresponding to a set of densities of a first reference color representing achromatic color, and representing lightness higher than the reference lightness, the density of the same hue reference color of lower lightness is substantially 0.

C4. Variation 4:

In the embodiments hereinabove, some of the arrangements realized through hardware could be substituted with software, and conversely some of the arrangements realized through software could be substituted with hardware. For example, some of the functions of the printer driver 96 (see FIG. 2) could be executed by a hardware circuit.

A computer program for realizing such functions could be provided in a form recorded on a floppy disk, CR-ROM, or other computer-readable recording medium. A host computer may read the computer program from the recording medium and transfer it to an internal storage device or an external storage device. Alternatively, the computer program may be provided to the host computer from a program supplying device, via a communications pathway. When realizing the functions of a computer program, the computer program stored in an internal storage device is executed by the microprocessor of the host computer. Alternatively, the computer program recorded on the recording medium can be executed directly by the host computer.

Host computer herein refers to a concept that includes hardware devices and an operating system, and means that the hardware devices operate under the control of the operating system. A computer program accomplishes the functions of the parts described above on such a host computer. Some of the aforementioned functions can be realized by the operating system, rather than by an application program.

In this invention, "computer-readable recording medium" is not limited to flexible disks, CR-ROM, or other portable recording media, but can include computer internal storage devices such various kinds of RAM and ROM, as well as hard disks and other external storage devices fixed to the computer.

The Program product may be realized as many aspects. For example:

(i) Computer readable medium, for example the flexible disks, the optical disk, or the semiconductor memories;
(ii) Data signals, which comprise a computer program and are embodied inside a carrier wave;
(iii) Computer including the computer readable medium, for example the magnetic disks or the semiconductor memories; and
(iv) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. An image processing device for generating color data comprising:

a lookup table including first color data associated with second color data, the first color data being represented in terms of density of one or more first reference colors, and the second color data being represented in terms of density of a plurality of second reference colors; and a color conversion unit configured to generate the second color data based on the first color data by referring to the lookup table, wherein the plurality of second reference colors are colors of inks used by a printing device, and include two same hue reference colors having same hue but different lightness, and the lookup table is a table in which, from among a plurality of data sets of the second color data that correspond to a plurality of data sets of the first color data representing achromatic color, for data sets of second color data representing color of higher lightness than a reference lightness, a first same hue reference color having lower lightness among the two same hue reference colors has density of 0, wherein the reference lightness is lightness equivalent to 110% or less of minimum lightness which is lightness of color having lowest lightness among colors that is able to be reproduced on a printing medium using only ink of the first same hue reference color.

2. An image processing device according to claim 1, wherein the first reference color is gray.

3. An image processing device according to claim 1, wherein the first reference colors are red, green and blue.

4. An image processing device according to claim 1, wherein a number of specific data sets of the second color data held in the lookup table is two or fewer, wherein the second color data is such that lightness of color represented by the specific data set is darker than the minimum lightness, and density of the first same hue reference color in the specific data set is 0.

5. An image processing device according to claim 1, wherein the plurality of the second reference colors include two pairs of the two same hue reference colors, a first pair of the two same hue reference colors are cyan and light cyan with higher lightness than the cyan; and a second pair of the two same hue reference colors are magenta and light magenta with higher lightness than the magenta.

6. A printing device for executing printing according to image data, comprising:

the image processing device according to claim 1 which, based on first image data in which pixel color is represented by the first color data, generates second image data in which pixel color is represented by the second color data; and a printing unit which executes printing according to the second image data using inks of the plurality of second reference colors.

7. A method of generating a lookup table for generating color data comprising:

acquiring, by a processor, an original lookup table including first color data associated with second color data, the first color data being represented in terms of density of one or more first reference colors, and the second color data being represented in terms of density of a plurality of second reference colors, the plurality of second reference colors being colors of inks used by a printing device and including two same hue reference colors having same hue but different lightness, wherein a first same hue reference color having lower lightness among the two same hue reference colors has density of 0 in the original lookup table; and generating, by the processor, a lookup table based on the original lookup table by substituting at least a portion of densities of a second same hue reference color by densities of the first same hue reference color, for at least a portion of a plurality of data sets of specific second color data in the original lookup table, the second same hue reference color having higher lightness among the two same hue reference colors, wherein the data sets of the specific second color data
- corresponds to a plurality of data sets of the first color data representing achromatic color, and
- represents color of lower lightness than a reference lightness which is lightness equivalent to 110% or less of minimum lightness, wherein the minimum lightness is lightness of color having lowest lightness among colors that can be reproduced on a printing medium using only ink of the first same hue reference color.

8. A method according to claim 7, wherein
the substitution of densities comprises:
- reducing the density of the second same hue reference color; and
- as density of the first same hue reference color, deciding a density of the first same hue reference color which can reproduce a color substantially equal to a color that is to be reproduced by the reduced density of second same hue reference color.

9. A method according to claim 7, wherein the generation of the lookup table includes:
- of a plurality of data sets of the second color data held in the original lookup table, carrying out the substitution for all data sets of the specific second color data representing colors of lower lightness than the reference lightness.

* * * * *